(12) United States Patent
Oh et al.

(10) Patent No.: US 9,391,524 B2
(45) Date of Patent: Jul. 12, 2016

(54) HYSTERETIC-MODE PULSE FREQUENCY MODULATED (HM-PFM) RESONANT AC TO DC CONVERTER

(71) Applicant: Apple Inc., Cupertino, CA (US)

(72) Inventors: InHwan Oh, Cupertino, CA (US); Nicholas A. Sims, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 482 days.

(21) Appl. No.: 13/720,811

(22) Filed: Dec. 19, 2012

(65) Prior Publication Data

US 2014/0160805 A1 Jun. 12, 2014

Related U.S. Application Data

(60) Provisional application No. 61/734,913, filed on Dec. 7, 2012.

(51) Int. Cl.
*H02M 3/335* (2006.01)
*H02M 1/42* (2007.01)
*H02M 7/217* (2006.01)

(52) U.S. Cl.
CPC ........ *H02M 3/33507* (2013.01); *H02M 1/4258* (2013.01); *H02M 7/217* (2013.01); *Y02B 70/126* (2013.01); *Y02B 70/1441* (2013.01)

(58) Field of Classification Search
CPC .......... Y02B 70/1433; Y02B 70/1425; H02M 3/33507; H02M 1/4258; H02M 7/217
USPC ............................................. 363/21.02, 21.03
See application file for complete search history.

(56) References Cited

U.S. PATENT DOCUMENTS

| 6,034,489 | A | 3/2000 | Weng | |
|---|---|---|---|---|
| 2006/0152947 | A1* | 7/2006 | Baker et al. | ...................... 363/16 |
| 2007/0165426 | A1* | 7/2007 | Kyono | ................ H02M 3/3376 363/21.02 |
| 2008/0197817 | A1* | 8/2008 | Colbeck | .............. H02M 1/4225 323/205 |
| 2011/0317450 | A1 | 12/2011 | Cheng | |
| 2012/0033451 | A1 | 2/2012 | Usui | |
| 2012/0262954 | A1 | 10/2012 | Duvnjak | |
| 2012/0300502 | A1 | 11/2012 | Shimada | |
| 2013/0121036 | A1* | 5/2013 | Peng | ................... H02M 3/3376 363/21.02 |

FOREIGN PATENT DOCUMENTS

WO PCT/IB2011/050983 A1 9/2011
WO PCT/IB2011/055647 A2 6/2012

* cited by examiner

*Primary Examiner* — Jue Zhang
(74) *Attorney, Agent, or Firm* — Blank Rome LLP

(57) ABSTRACT

The disclosed embodiments provide an AC/DC power converter that converts an AC input voltage into a DC output voltage. This AC/DC power converter includes an input rectifier stage which rectifies an AC input voltage into a first rectified voltage. The AC/DC power converter also includes a switching resonant stage which is directly coupled to the output of the input rectifier stage. The switching resonant stage converts the rectified voltage into a first high frequency AC voltage of a first amplitude. This AC/DC power converter additionally includes a transformer which is coupled to the output of the switching resonant stage and is configured to down-convert the first high frequency AC voltage into a second high frequency AC voltage of a second amplitude. Furthermore, the AC/DC power converter includes an output rectifier stage which is coupled to the output of the transformer, wherein the output rectifier stage rectifies the second high frequency AC voltage into a DC output voltage.

23 Claims, 10 Drawing Sheets

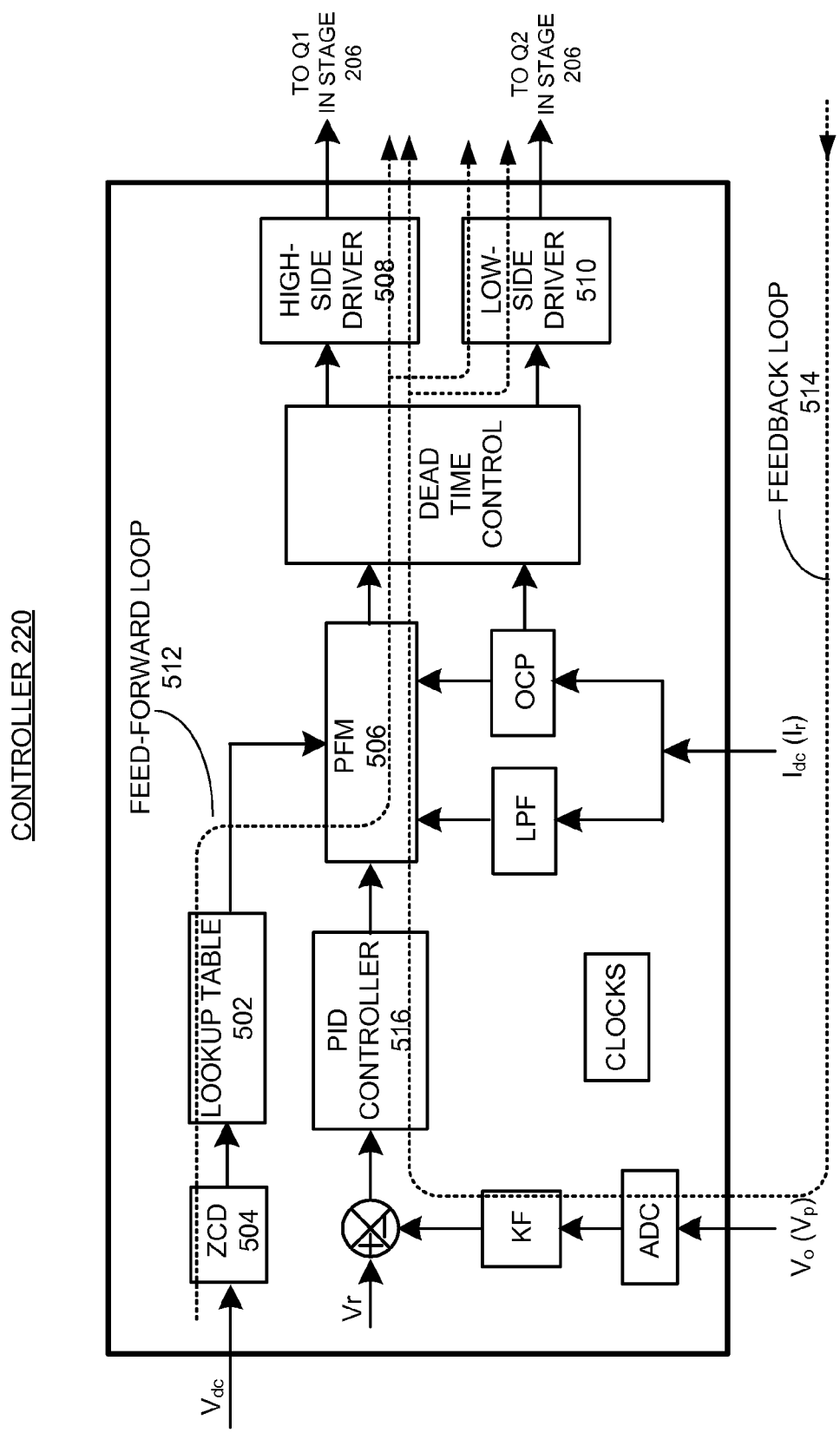

HYSTERETIC-MODE PULSE FREQUENCY MODULATED (HM-PFM) RESONANT AC TO DC CONVERTER

RELATED APPLICATION

This application hereby claims priority under 35 U.S.C. §119 to U.S. Provisional Application No. 61/734,913, entitled "A HYSTERETIC-MODE PULSE FREQUENCY MODULATED (HM-PFM) RESONANT AC TO DC CONVERTER," by inventors InHwan Oh and Nicholas A. Sims filed on 7 Dec. 2012.

The subject matter of this application is related to the subject matter in a co-pending non-provisional application Ser. No. 13/680,970, entitled "AC-DC RESONANT CONVERTER THAT PROVIDES HIGH EFFICIENCY AND HIGH POWER DENSITY," by inventor InHwan Oh, filed 19 Nov. 2012.

BACKGROUND

1. Field

The disclosed embodiments relate to the design of AC-to-DC power converters. More specifically, the disclosed embodiments relate to designing high efficiency, high power density AC-to-DC resonant power converters.

2. Related Art

AC-to-DC (or "AC/DC") power converters are often used to convert a primary AC power source (e.g., AC power supply from a wall outlet) into a rectified DC voltage which can then be supplied to various electronic devices. Switched-mode power converters are a type of AC/DC power converter which incorporates a switching regulator to convert electrical power from AC to DC more efficiently. Power supplies which employ switched-mode power converters (often referred to as "SMPS") are commonly used in modern computing devices (e.g., both desktop and laptop computers, tablet computers, portable media players, smartphones, and/or other modern computing devices), battery chargers, and electrical vehicles, among other applications.

Power supply designers are constantly developing better AC/DC converter designs to meet the growing demand for greater efficiency, smaller size, and lighter weight. An SMPS design which uses an LLC resonant converter topology has shown remarkably high efficiency and high power density. A conventional switched-mode LLC resonant AC/DC converter typically includes a pre-regulator stage (often referred to as a "power factor correction" or "PFC stage") following an AC input rectifier. This PFC stage converts a rectified AC voltage from the AC input rectifier into a DC voltage. This DC voltage is then fed into a DC/DC LLC resonant converter. However, the PFC stage uses a bulky high voltage DC capacitor to filter the rectified low frequency AC input, which can take up a substantial amount of space. Furthermore, the PFC stage typically needs to have the same power rating as the following LLC converter stage. When the power is converted using both the PFC and the LLC stages, the ability of the system to achieve high efficiency and high power density may be severely limited by the bulky high voltage DC capacitor and the PFC stage which can include many components.

Hence, what is needed is an AC/DC power converter design for an SMPS which at least eliminates the bulky DC capacitor and the PFC stage.

SUMMARY

The disclosed embodiments provide an AC/DC power converter that converts an AC input voltage to a DC output voltage. This AC/DC power converter includes an input rectifier stage which rectifies an AC input voltage into a first rectified voltage of a first constant polarity and a first amplitude. The AC/DC power converter also includes a switching resonant stage which is directly coupled to the output of the input rectifier stage. This switching resonant stage converts the rectified voltage into a second rectified voltage of a second constant polarity (which can be the same as the first constant polarity) and a second amplitude (which can be much smaller than the first amplitude). The AC/DC power converter additionally includes an output rectifier stage coupled to the output of the switching resonant stage, wherein the output rectifier stage rectifies the second rectified voltage into a DC output voltage.

In some embodiments, this AC/DC power converter further includes a controller coupled between the output of the second rectifier stage and the input of the switching resonant stage. More specifically, the controller receives the DC output voltage as a feedback signal and generates one or more control signals which drive the switching resonant stage.

In some embodiments, the AC/DC power converter does not use a pre-regulator (PFC) stage between the input rectifier stage and the switching resonant stage.

The disclosed embodiments also provide a hysteretic-mode AC/DC power converter that converts an AC input voltage into a DC output voltage. This AC/DC power converter includes an input rectifier stage which rectifies an AC input voltage into a first rectified voltage. The AC/DC power converter also includes a switching resonant stage which is directly coupled to the output of the input rectifier stage. The switching resonant stage converts the rectified voltage into a first high frequency AC voltage of a first amplitude. This AC/DC power converter additionally includes a transformer which is coupled to the output of the switching resonant stage and is configured to down-convert the first high frequency AC voltage into a second high frequency AC voltage of a second amplitude (which is significantly smaller than the first amplitude). Furthermore, the AC/DC power converter includes an output rectifier stage which is coupled to the output of the transformer, wherein the output rectifier stage rectifies the second high frequency AC voltage into a DC output voltage.

In some embodiments, the hysteretic-mode AC/DC power converter further includes a controller coupled between the primary winding of the transformer and the input of the switching resonant stage. More specifically, the controller receives a primary voltage associated with the primary winding of the transformer as a feedback input signal and generates one or more control signals which drive the switching resonant stage.

In some embodiments, the hysteretic-mode AC/DC power converter does not use a pre-regulator (PFC) stage between the input rectifier stage and the switching resonant stage.

BRIEF DESCRIPTION OF THE FIGURES

FIG. 5 illustrates a block diagram of controller 220 within AC/DC converter 200 in accordance with some embodiments herein.

In the figures, like reference numerals refer to the same figure elements.

DETAILED DESCRIPTION

The disclosed embodiments provide switched-mode resonant AC/DC power converter designs which can be used to supply DC power to computing devices (e.g., desktop computers, laptop computers, tablet computers, portable media players, smartphones, and/or other modern computing devices), battery chargers, and electrical vehicles, among other applications.

In particular embodiments, an LLC resonant AC/DC power converter which does not use a pre-regulator (PFC) stage between the input rectifier and the switching resonant stage is described. This AC/DC power converter uses a controller in a feedback loop to monitor the output voltage and to control the switching operation of the switching resonant stage. The controller is also part of a feed-forward loop, which is used to compensate for the effect of an unregulated sine-wave in the AC input voltage on the output voltage. In one embodiment, the feed-forward loop includes a lookup table which stores pre-calibrated driving frequency vs. time curves. During operation, the controller can generate a control signal with time varying frequencies based on a selected driving frequency vs. time curve. The control signal is then used to drive the switching resonant stage, wherein the time varying drive frequencies modulate the transfer function of the switching resonant stage and compensate for the effect of the unregulated sine-wave on the output voltage. By using both the feedback loop and the feed-forward loop to control the switching operation, the proposed AC/DC power converter obtains a flat DC output voltage from a high voltage sine-wave AC input voltage without the need of a PFC stage.

Figure 1:
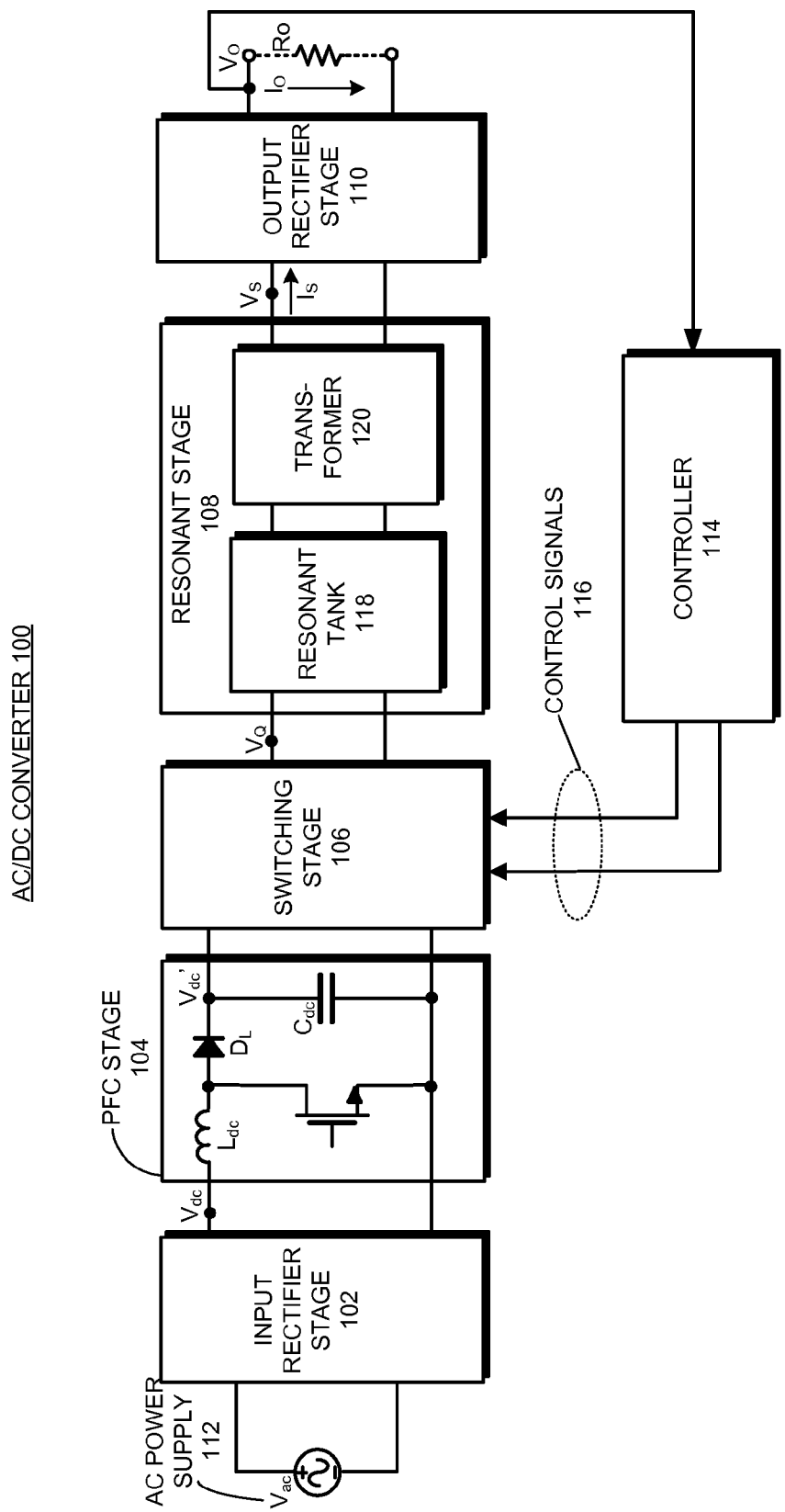
FIG. 1 illustrates a block diagram of a switched-mode resonant AC/DC power converter which converts an AC input voltage to a DC output voltage in accordance with some embodiments.

FIG. 1 illustrates a block diagram of a switched-mode resonant AC/DC power converter 100 which converts an AC input voltage to a DC output voltage in accordance with some embodiments. As is illustrated in FIG. 1, switched-mode resonant AC/DC power converter 100 ("AC/DC converter 100" hereinafter) includes an input rectifier stage 102, a pre-regulator (PFC) stage 104, a switching stage 106, a resonant stage 108, and an output rectifier stage 110. More specifically, input rectifier stage 102 is coupled to an AC power supply 112 which provides an AC input voltage $V_{ac}$ (e.g., a 50 Hz or 60 Hz utility voltage). Note that, while not shown, an electromagnetic interference (EMI) filter is typically coupled between AC power supply 112 and input rectifier stage 102. Such an EMI filter can be part of AC/DC converter 100. Input rectifier stage 102 rectifies AC voltage $V_{ac}$ into a first rectified voltage $V_{dc}$ which has a constant polarity.

Input rectifier stage 102 is coupled to PFC stage 104, which regulates rectified voltage $V_{dc}$ into a regulated DC voltage $V_{dc}'$. Note that PFC stage 104 includes a DC capacitor $C_{dc}$ and the boost inductor $L_{dc}$ which serve as a low-pass filter. To achieve a low-ripple $V_{dc}'$ output, a large size inductor $L_{dc}$ and a bulky $C_{dc}$ with a large capacitance are typically used. In the embodiment shown, PFC stage 104 additionally includes a diode $D_L$ and other circuit components. Note that PFC stage 104 can also use other regulator designs to obtain regulated DC voltage $V_{dc}'$, and therefore is not limited to the specific embodiment of FIG. 1. However, PFC stage 104 almost always includes a large DC capacitor such as $C_{dc}$.

Further referring to FIG. 1, note that the output of PFC stage 104 is coupled to switching stage 106, which converts DC voltage $V_{dc}'$ into a high frequency AC voltage $V_Q$. More specifically, switching stage 106 can include one or more switches driven by control signals 116 generated by a controller 114. In one embodiment, control signals 116 drive a pair of serially coupled switches with alternating 50% duty cycle for each switch, thereby generating square wave $V_Q$ with a 50% duty cycle. Note that controller 114 also receives an input from the output of rectifier stage 110.

Switching stage 106 is followed by resonant stage 108, which receives AC voltage $V_Q$ as input. Resonant stage 108 further comprises a resonant tank 118, and a transformer 120 which follows resonant tank 118 to step down the high input voltage $V_Q$. Resonant tank 118 can contain a serial or a parallel combination of inductors and capacitors, and many resonant tank designs can be used. Generally, resonant tank 118 is inserted after switching stage 106 to allow the switching stage to operate at zero voltage switching (ZVS) or zero current switching (ZCS) conditions. As a result, switching stage 106 can operate at high switching frequencies with very low switching losses. Next, transformer 120 generates a stepped-down AC voltage Vs and an associated AC current $I_S$ at the output of resonant stage 108.

Further referring to FIG. 1, note that resonant stage 108 is coupled to output rectifier stage 110. Output rectifier stage 110, which can be made of any conventional circuit, converts AC voltage Vs into a DC voltage $V_O$, which is also the output of AC/DC power converter 100. In the embodiment shown, DC output voltage $V_O$ and the associated DC current Is are subsequently supplied to a load $R_O$, which is typically not considered as part of AC/DC power converter 100. As mentioned above, DC voltage $V_O$ is used as feedback to controller 114. Controller 114 can generate an error based on $V_O$ and use the error to adjust control signals 116 that drive switching stage 106.

In a proposed AC/DC power converter design based on AC/DC converter 100, PFC stage 104 (including the large DC capacitor $C_{dc}$) is eliminated, thus input rectifier stage 102 and switching stage 106 are directly coupled to each other. This results in a more compact AC/DC power converter with a smaller size, higher efficiency, and higher power density. As a consequence of eliminating the PFC stage, switching stage 106 receives rectified input voltage $V_{dc}$ which contains large sinusoidal ripples. To ensure that converter output $V_O$ is substantially a constant DC voltage, a proposed embodiment redesigns controller 114 so that control signals 116 continuously vary in frequency. We now describe the proposed AC/DC power converter which does not use a PFC stage.

Figure 2:
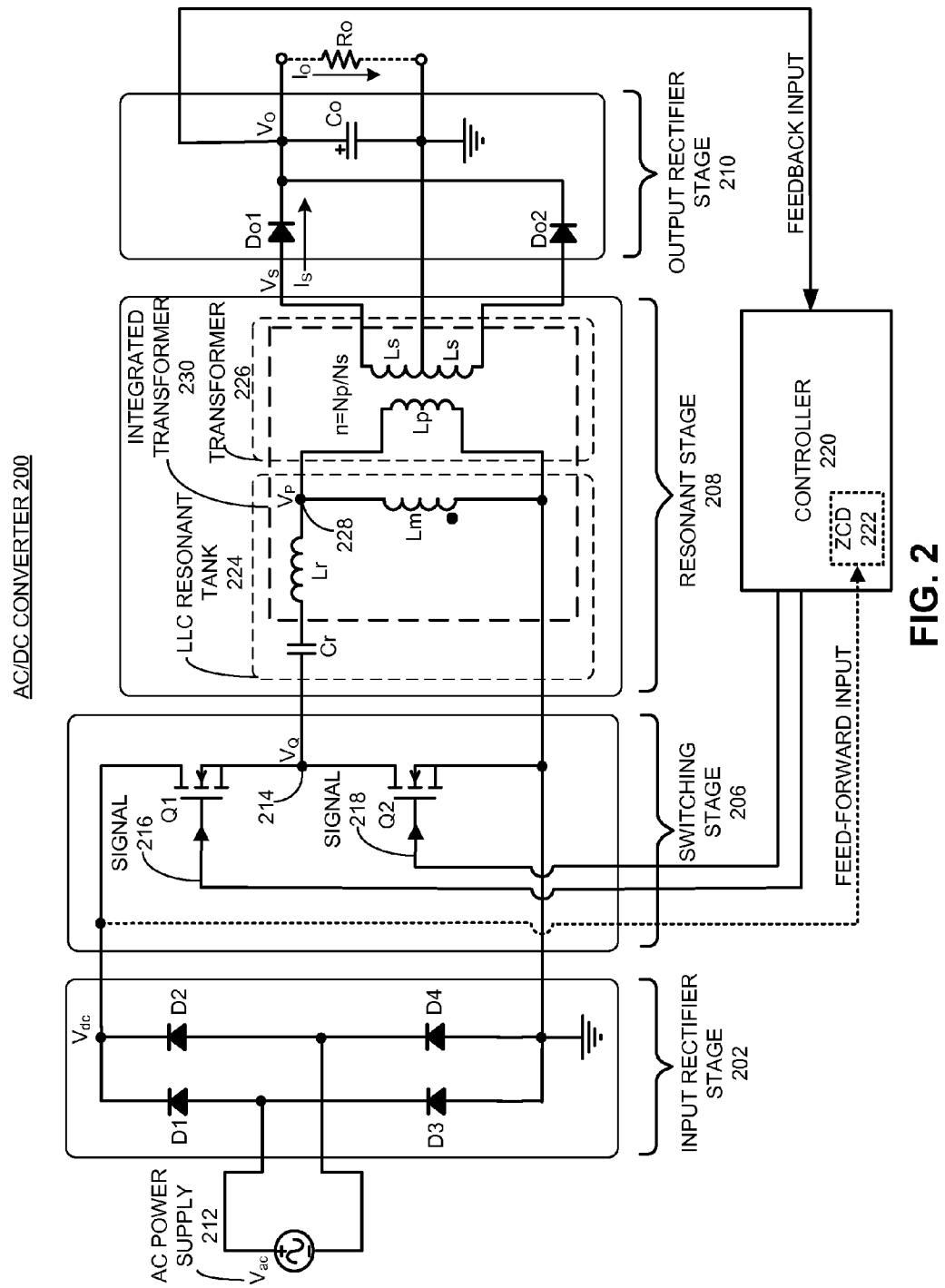
FIG. 2 illustrates a simplified switched-mode LLC resonant AC/DC power converter which converts an AC input voltage to a DC output voltage in accordance with some embodiments herein.

FIG. 2 illustrates a simplified switched-mode LLC resonant AC/DC power converter 200 which converts an AC input voltage to a DC output voltage in accordance with some embodiments herein. As is illustrated in FIG. 2, switched-mode LLC resonant AC/DC power converter 200 ("AC/DC converter 200" hereinafter) includes an input rectifier stage 202, a switching stage 206, a resonant stage 208, and an output rectifier stage 210. However, AC/DC converter 200 does not include a PFC stage similar to PFC stage 104 in AC/DC converter 100. As a result, the output of input rectifier stage 202 is directly coupled to the input of switching stage 206. By removing the PFC stage from AC/DC converter 200, the proposed embodiment also eliminates the DC capacitor $C_{dc}$. We now describe each of the remaining stages of AC/DC power converter 200 in detail.

Input rectifier stage 202 may be substantially similar to input rectifier stage 102 in AC/DC converter 100. More specifically, input rectifier stage 202 is coupled to an AC power supply 212 which provides an AC input voltage $V_{ac}$ (e.g., a 60 Hz utility voltage). In one embodiment, $V_{ac}$ has a sine waveform. In some embodiments, input rectifier stage 202 is coupled to AC power supply 212 through an AC power plug. Although not shown, an electromagnetic interference (EMI) filter is typically coupled between AC power supply 212 and input rectifier stage 202. Such an EMI filter can be part of AC/DC converter 200. Input rectifier stage 202 rectifies AC voltage $V_{ac}$ into a first rectified voltage $V_{dc}$ which has a constant polarity and large ripples having the same amplitude as $V_{ac}$. In the embodiment shown, input rectifier stage 202 uses a full-wave bridge rectifier comprising four diodes D1-D4. However, input rectifier stage 202 can use other rectifier types (e.g., a half-wave bridge rectifier) to obtain rectified voltage $V_{dc}$, and therefore is not limited to the specific embodiment of FIG. 2.

Further referring to FIG. 2, note that input rectifier stage 202 is directly coupled to switching stage 206, which converts low frequency rectified voltage $V_{dc}$ into a high frequency AC voltage $V_Q$ at node 214. Switching stage 206 may be substantially similar to switching stage 106 in AC/DC converter 100. In the embodiment shown, switching stage 206 uses a pair of serially coupled MOSFETs Q1 and Q2 as switches, wherein Q1 and Q2 are driven by control signals 216 and 218 coupled to the gate of the respective MOSFET. However, switching stage 206 can also use other switching circuits or techniques to obtain high frequency AC voltage $V_Q$, and therefore is not limited to the specific embodiment of FIG. 2. For example, instead of using two MOSFET switches, switching stage 206 can use other power devices such as IGBT, GaN, SiC, or bipolar high voltage transistors driven by two control signals 216 and 218. Note that control signals 216 and 218 are generated by a controller 220 which is coupled between the inputs of switching stage 206 and the output of output rectifier stage 210. In some embodiments, controller 220 is used in a feedback loop which adjusts control signals 216 and 218 so that rectifier stage 210 output is a substantially regulated DC voltage against the AC input voltage and load variations.

Note that controller 220 can receive $V_{dc}$ as a feed-forward input, and then use a zero-cross detector (ZCD) 222 to detect zero crossings within $V_{dc}$. This timing information can be used by controller 220 to synchronize control signals 216 and 218 to input voltage $V_{dc}$. Note that while ZCD 222 is shown as a module within controller 220, other embodiments can use a discrete ZCD outside controller 220 to receive $V_{dc}$, and generate timing information as output which is then fed to controller 220. In some embodiments, however, neither an integrated ZCD nor a discrete ZCD is used in AC/DC converter 200, and controller 220 identifies the zero crossings or its phase angle in $V_{dc}$ using other techniques. We describe an exemplary design of controller 220 in more detail below in conjunction with FIG. 4.

Further referring to FIG. 2, note that switching stage 206 is followed by resonant stage 208, which receives high amplitude AC voltage $V_Q$ as input. Resonant stage 208 may be substantially similar to resonant stage 108 in AC/DC converter 100. More specifically, resonant stage 208 further comprises an LLC resonant tank 224, and a transformer 226 which follows LLC resonant tank 224 to step down the high input voltage $V_Q$. More superficially, LLC resonant tank 224 comprises two inductors Lr (often referred to as a "leakage inductor") and Lm (often referred to as a "magnetizing inductor"), and one capacitor Cr. Note that LLC resonant tank 224 typically has two resonant frequencies. Note also that transformer 226 (and the rest of AC/DC converter 200) is connected in parallel to the inductor Lm.

As mentioned above, a resonant tank is generally inserted after the switching stage to allow the switching stage to operate at zero voltage switching (ZVS) or zero current switching (ZCS) conditions. LLC resonant tank 224 has a number of advantages over many other resonant tank configurations. For example, an LLC resonant converter can operate under ZVS condition over a wide range of load, even under no load, conditions. Moreover, an LLC resonant converter can operate within a narrow frequency variation range over a wide load range. Note that resonant stage 208 can use other resonant tank configurations, such as a simple serial resonant tank, a simple parallel resonant tank, or other combinations of two or three inductors and capacitors. Hence, the resonant tank in resonant stage 208 is not limited to the specific embodiment illustrated in FIG. 2.

LLC resonant tank 224 generates an intermediate AC voltage $V_P$ at node 228. Next, transformer 226 generates a stepped-down AC voltage Vs and an associated AC current $I_S$ at the output of resonant stage 208. Note that transformer 226 is configured to have an input to output turns ratio of n=Np/Ns, wherein Np and Ns are the number of turns of transformer coils on the primary side and the secondary side, respectively. Note that leakage inductor Lr and magnetizing inductor Lm can be discrete components, or can be integrated into transformer 226. In the embodiment shown in FIG. 2, both inductors Lr and Lm are integrated with transformer 226 as part of an integrated transformer 230.

Note that resonant stage 208 is coupled to output rectifier stage 210. Output rectifier stage 210, which is substantially similar to output rectifier stage 110 in AC/DC converter 100, converts AC voltage Vs into a DC voltage $V_O$, which is also the output of AC/DC converter 200. In the embodiment shown, output rectifier stage 210 includes a full-wave rectifier comprising two diodes Do1 and Do2, a center-tapped transformer, and a low-pass filter Co. Rectified voltage Vo and the associated DC current Is are subsequently supplied to a load $R_O$, which is typically not considered as part of AC/DC converter 200. As mentioned above, the rectified voltage $V_O$ is used as a feedback signal to controller 220. Controller 220 can generate an error based on $V_O$ and use the error to adjust control signals 216 and 218 until the output voltage $V_O$ is a substantially DC signal.

Compared with AC/DC converter 100, AC/DC converter 200 provides a simpler, more compact and more efficient converter design. However, by removing the PFC stage, input to the switching stage is a rectified sine-wave with a low frequency (assuming AC power supply has a sine waveform). The sine-wave modulated voltage is then propagated to $V_Q$ and $V_P$. If a conventional driving frequency controller 114 is used, the output $V_O$ will also be modulated by the low-frequency sine-wave because of the high ripple associated with Vdc, which is not desirable. We now describe how controller 220 can be configured to compensate for the sine-wave modulation in the converter output $V_O$.

We first compute output voltage gain $G=V_P/V_Q$ (i.e., "the transfer function") of resonant stage 208. Note that in LLC resonant tank 224, serially coupled Cr and Lr are in series with Lm, which is in parallel to the rest of AC/DC converter 200. To compute voltage gain of $V_P$ at node 228 to $V_Q$ at node 218, we use voltage divider theory to get:

$$G(\omega) = \left| \frac{jX_{Lm} // R_{eq}}{(jX_{Lm} // R_{eq}) + j(X_{Lr} - X_{Cr})} \right|,$$

wherein ω is the driving frequency of control signals 216 and 218; $X_{Lm}$, $X_{Lr}$, and $X_{Cr}$ are the reactance of inductors Lm and Lr, and capacitor Cr, respectively; and $R_{eq}$ is the equivalent impedance of the rest of AC/DC converter 200 in parallel with Lm. $R_{eq}$ may be expressed as:

$$R_{eq}(n) = 8 \frac{n^2}{\pi^2} R_o,$$

wherein n is the turns ratio Np/Ns, and $R_o$ is the impendence of the load.

Note that $X_{Lm}(\omega)=\omega L_m$, $X_{Lr}(\omega)=\omega L_r$, and $$X_{Cr}(\omega) = \frac{1}{\omega C_r}$$

are all functions of the driving frequency $f=\omega/(2\pi)$. Hence, output voltage gain G is also a function of the driving frequency. We observe that if f is fixed in time, G(f) is also fixed. If the AC input $V_{ac}$ can be expressed as $V_{ac}=V_{pk}\sin(wt)$, then $V_Q$ includes a sine-wave modulation proportional to |sin(wt)|, wherein w is the frequency of the AC input $V_{ac}$. The sine-wave modulation is propagated from $V_Q$ to $V_P$, and then to Vs, and ultimately presents in output voltage Vo. Note that in order to obtain a flat output voltage Vo, this sine-wave modulation on Vo needs to be compensated.

In one embodiment, this compensation can be achieved by varying driving frequency f with time t over each period of the half sine-wave |sin(wt)|. More specifically, when the value of Vo corresponds to a larger value in the sine-wave, we design f such that G(f) has a lower value; and when the value of Vo corresponds to a lower value in the sine-wave, we design f such that G(f) has a higher value. Hence, over each |sin(wt)| period, driving frequency f and hence G(f) are continuously varied with time t. In one embodiment, we can configure f(t) over each |sin(wt)| period so that the product of sin(wt) and G(f(t)) is near constant.

Figure 3:
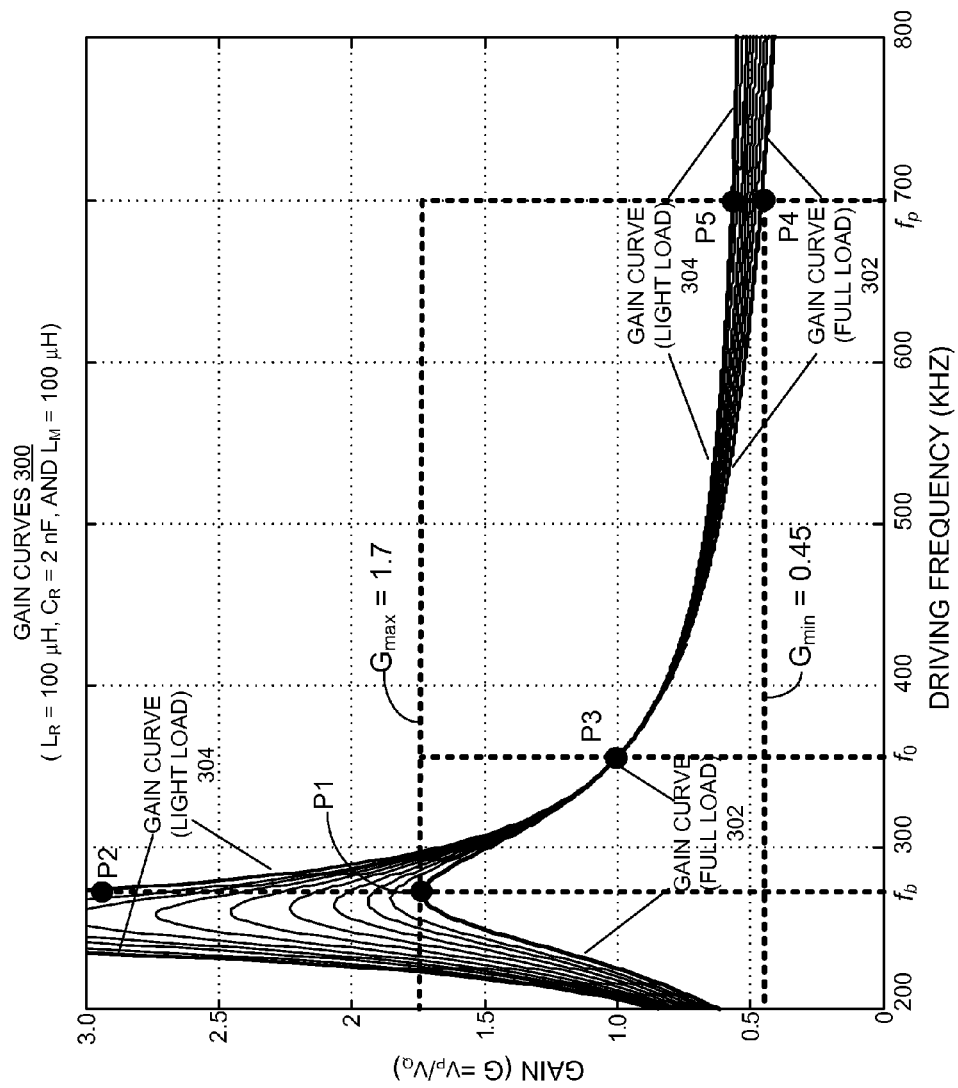
FIG. 3 illustrates gain vs. driving frequency curves for a given LLC resonant converter design in accordance with some embodiments herein.

FIG. 3 illustrates gain vs. driving frequency curves (gain curves) 300 for a given LLC resonant converter design in accordance with some embodiments herein. More specifically, FIG. 3 illustrates a group of characteristic gain ($G=V_P/V_Q$) vs. driving frequency (f) curves (or "gain curves") measured for an LLC resonant converter at different load conditions, wherein the LLC resonant tank has the following values: Lr=100 µH, Cr=2 nF, and Lm=100 µH.

Note that among the group of gain curves, gain curve 302, which was measured under a full load condition, is the lowest curve on the plot among the group of curves. There are three characteristic points shown on gain curve 302: P1, P3, and P4. P1 is where gain curve 302 reaches the maximum gain $G_{max}$=1.7 at a driving frequency $f_b$≈270 kHz. P3 corresponds to one of two resonant frequencies $f_0$ of the LLC resonant tank. Note that the group of gain curves at different load conditions intersects at P3 which corresponds to a unit gain. P4 corresponds to a minimum gain $G_{min}$=0.45 on gain curve 302 at a driving frequency $f_p$≈700 kHz. Note that between drive frequencies $f_b$ and $f_p$, voltage gain G(f) monotonically decreases as driving frequency f increases from $f_b$ to $f_p$. In other words, G(f) associated with gain curve 302 is an inverse function of driving frequency f between $f_b$ and $f_p$.

FIG. 3 also illustrates gain curve 304 corresponding to a light load condition, which is the tallest curve among the group of curves. There are three characteristic points shown on gain curve 304: P2, P3, and P5. P2 is a point on gain curve 304 corresponding to the driving frequency $f_b$≈270 kHz where gain curve 302 achieves the maximum gain. Note that P2 corresponds to a gain on gain curve 304 which is significantly greater than $G_{max}$. P3 on gain curve 304 is the same P3 on gain curve 302. P5 is a point on gain curve 304 corresponding to driving frequency $f_p$≈700 kHz where gain curve 304 has a low gain $G_{min}$=0.55. Note that G(f) associated with gain curve 304 is also an inverse function of driving frequency f between $f_b$ and $f_p$.

FIG. 3 also illustrates additional gain curves which were calibrated for other load conditions in between the full load and the light load. These gain curves fall between gain curves 302 and 304. Within each of these curves, an inverse region between driving frequency f and G(f) can also be identified. Based on the inverse property of the gain curves, we can design a driving frequency curve to compensate for the effect of sine-wave ripple on the output voltage Vo. However, due to the nonlinear nature of the inverse region in the gain curves, this driving frequency curve needs to be calibrated for each design parameter of resonant stag 208.

Figure 4B:
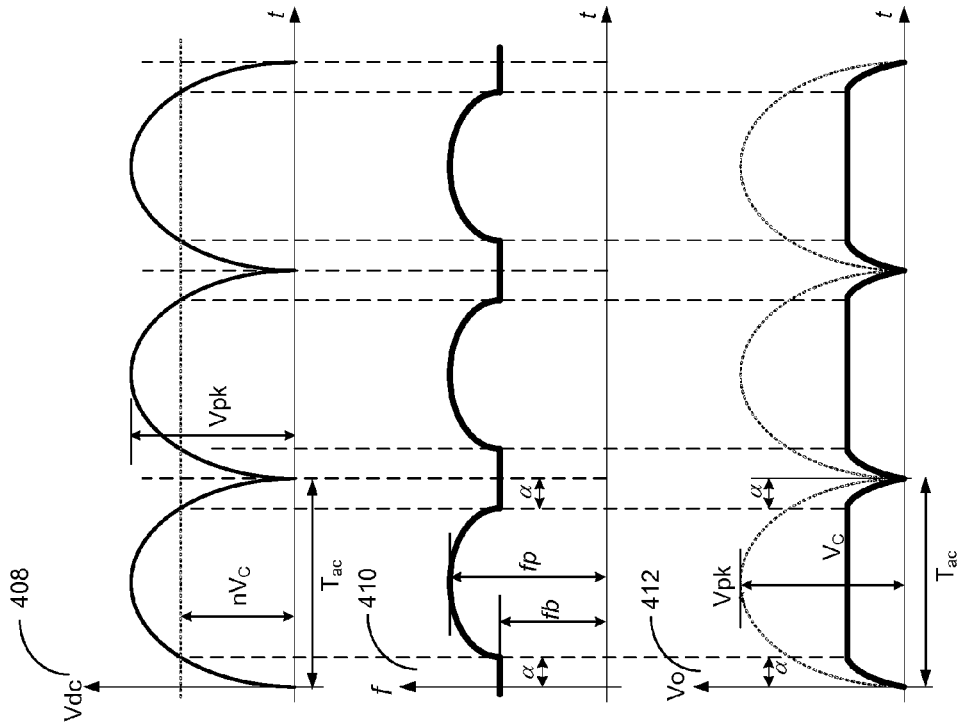
FIG. 4B illustrates a process for determining a driving frequency curve which includes constant driving frequency regions in accordance with some embodiments herein.
Figure 4A:
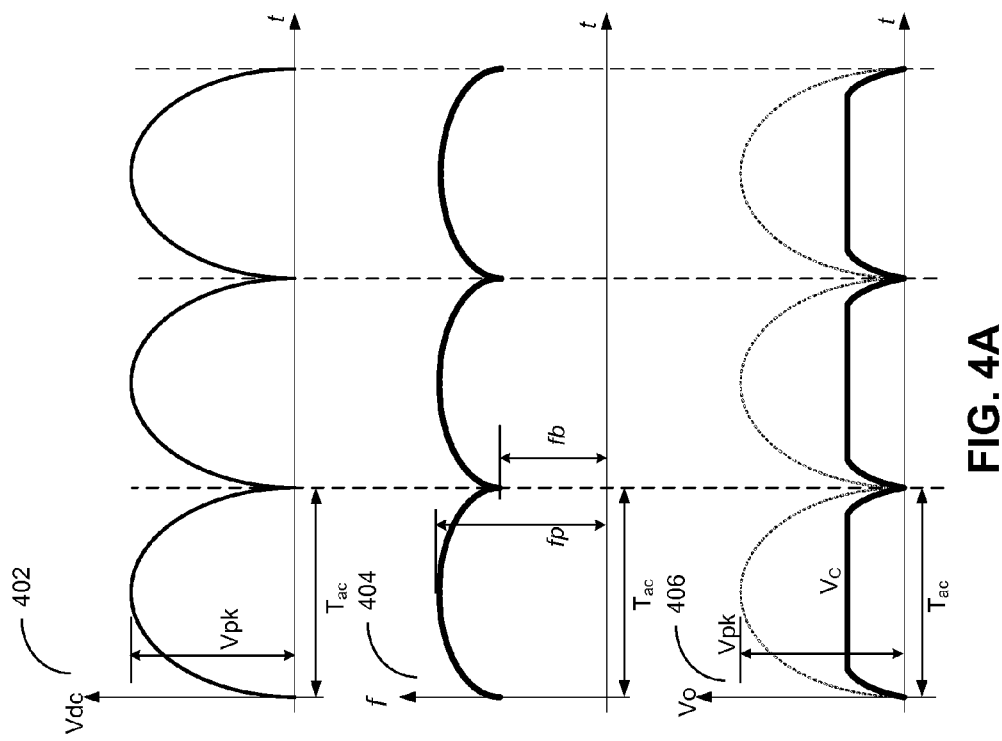
FIG. 4A illustrates a process for determining a driving frequency curve over a |sin(wt)| period for a given LLC resonant converter in accordance with some embodiments herein.

FIG. 4A illustrates a process for determining a driving frequency curve over a |sin(wt)| period for a given LLC resonant converter in accordance with some embodiments herein. Without losing generality, FIG. 4A is described in the context of FIG. 2 and FIG. 3.

Note that FIG. 4A comprises three subplots. The top subplot 402 illustrates the rectified voltage $V_{dc}$ at the output of input rectifier stage 202 as a function of time. More specifically, subplot 402 includes three periods ($3 \times T_{ac}$) of sine-waves of the same polarity and a peak amplitude $V_{pk}$. The problem is to find driving frequency f which controls gain curve G(f) so that AC/DC converter output Vo is substantially a constant DC voltage.

The middle subplot 404 illustrates the driving frequency f as a function of time over the same time period as subplot 402. Note that within each period $T_{ac}$, driving frequency f varies between a base frequency $f_b$ which corresponds to the zero positions in $V_{dc}$, and a peak frequency $f_p$ which corresponds to the peak voltage $V_{pk}$ in $V_{dc}$. In one embodiment, frequencies $f_b$ and $f_p$ are first determined based on gain curve 302 for the full load condition of the AC/DC converter in FIG. 3, wherein $f_b$ and $f_p$ are associated with the maximum gain $G_{max}$ and the minimum gain $G_{min}$ in gain curve 302. Once peak frequency $f_p$ and base frequency $f_b$ are determined, driving frequency f is varied between $f_b$ and $f_p$ based on the amplitude of $V_{dc}$, the gain curve G(f), and the objective to keep Vo a constant value. In one embodiment, driving frequency f has a range which falls between 200 kHz and 1 MHz.

In one embodiment, Vo corresponding to $V_{dc}=V_{pk}$ can be computed using the gain associated with $f_p$: $V_c=V_{pk} \cdot G_{min}/n$, wherein n is the turns ratio of the transformer. After Vo corresponding to the peak voltage is determined, the system can generate a driving frequency for each $V_{dc}$ value between 0 and $V_{pk}$ based on the selected gain curve G(f). For example, when $V_{dc}=0.75V_{pk}$, the system determines that $G(f)=G_{min}/0.75$ will produce the same constant output $V_c=V_{pk} \cdot G_{min}/n$. Next, the system can identify the driving frequency f from gain curve 302 between $f_b$ and $f_p$ that corresponds to gain value of $G_{min}/0.75$. In this manner, the full driving frequency curve f(t) can be constructed. Note that due to the symmetry, the system only needs to calibrate one half period of driving frequency f, which is then mirrored to obtain driving frequency values for a full period $T_{ac}$ (also referred to as a "driving frequency curve"). The calibrated driving frequency curve is then repeated to obtain frequency waveform of subplot 404. In one embodiment, the calibrated driving frequency curve of subplot 404 is stored in a lookup table which can be used by controller 220 to generate control signals 216 and 218. We describe a more detailed embodiment of controller 220 which uses such a lookup table in conjunction with FIG. 5.

The bottom subplot 406 in FIG. 4A illustrates output voltage Vo as a function of time over the same time period as subplot 404. Ideally, the above described output compensation technique will produce a flat DC output Vo substantially equal to $V_{pk} \cdot G_{min}/n$. However, because the maximum gain of gain curve 302 is limited to $G_{max}$ while $V_{dc}$ drops to a very low level on either end of the sine-wave, at some point $Vo=V_{dc} \times G(f)$ will roll off from the desired constant level toward zero. It can be seen that within each period $T_{ac}$, Vo includes a flat region in the middle of the waveform. However, near 0 and 180° phase angles, Vo dips toward zero which creates "valleys" in the output waveform. In one embodiment, these defects in Vo can be filtered out or reduced using a DC output capacitor. However, due to the low frequency nature of these defects, a very large capacitance would be required for this operation.

FIG. 4B illustrates a process for determining a driving frequency curve which includes constant driving frequency regions in accordance with some embodiments herein.

The top subplot 408 in FIG. 4B illustrates the same rectified voltage $V_{dc}$ as subplot 402 in FIG. 4A. The middle subplot 410 illustrates the driving frequency f as a function of time over the same time period as subplot 408. Similarly to subplot 404 in FIG. 4A, driving frequency f in subplot 410 varies between base frequency $f_b$ which corresponds to the zero positions in $V_{dc}$, and peak frequency $f_p$ which corresponds to the peak voltage $V_{pk}$ in $V_{dc}$. However, the base frequency $f_b$ is maintained from zero positions until positions defined by a distance α from the zero positions. Note that these two flat regions in the driving frequency curve define two constant gain regions with the maximum gain $G_{max}$. When the drive curve including these high gain regions is applied to input voltage $V_{dc}$, the high gain regions allow the flat region in the output voltage Vo to be more broadened, as is shown in the bottom subplot 412 in FIG. 4B. In one embodiment, the substantially constant Vo can be obtained between the two high gain regions.

Note that different techniques may be used to calibrate the α value. In one embodiment, α value is determined using the feedback loop described in conjunction with FIG. 2. More specifically, α value may be initialized from 0 and gradually increased, and for each new α value, Vo corresponding to f(α) is compared to a predetermined level (programmed inside controller 220). When Vo corresponding to f(α) increases to the predetermined level, α value is set and recorded. In another embodiment, after the constant output $V_c=V_{pk} \cdot G_{min}/n$ is computed, a constant voltage level $nV_c=V_{pk} \cdot G_{min}$ is compared with $V_{dc}$ in subplot 408, and α value is determined from the intersections of $nV_c$ and $V_{dc}$.

FIG. 5 illustrates a block diagram of controller 220 within AC/DC converter 200 in accordance with some embodiments herein. As is illustrated in FIG. 5, controller 220 includes a lookup table 502. In one embodiment, lookup table 502 stores one or more calibrated driving frequency curves (i.e., driving frequency vs. time curves). Note that detailed operations for constructing driving frequency curves have been described above in conjunction with FIG. 4A and FIG. 4B. A driving frequency curve in lookup table 502 may correspond to a unique LLC converter design. Moreover, different driving frequency curves may be associated with the same LLC converter design but different $V_{dc}$ inputs. For example, different driving frequency curves may be generated for different input waveforms (note that the input waveform is not limited to sine-waves, e.g., it can also include sine square waves, triangular waves and square waves, among others). Hence, during operation, the system can select a driving frequency curve from lookup table 502 based on the specific LLC converter design and input voltage $V_{dc}$.

In the embodiment shown, controller 220 also includes a zero-cross detector (ZCD) 504 which receives $V_{dc}$ as a feed-forward input and detects zero crossings within $V_{dc}$. This phase information is then used by controller 220 to synchronize the selected driving frequency curve with the $V_{dc}$ input. The time-synchronized values of the selected driving frequency curve are fed into pulse frequency modulator (PFM) 506. PFM 506 is configured to generate frequency modulated pulse signals based on the selected driving frequency curve, wherein the frequency modulated pulse signals are used by a high-side driver 508 and a low-side driver 510 to generate the two control signals 216 and 218 for the two switches Q1 and Q2. Note that lookup table 502, ZCD 504, PFM 506 and drivers 508 and 510 form a feed-forward loop 512 for compensating for the effect of $V_{dc}$ and generating a flat output voltage Vo from AC/DC converter 200.

As described above, controller 220 is also part of a feedback loop 514 in AC/DC converter 200 to keep the output voltage Vo constant. In one embodiment, the active feedback to controller 220 is obtained from Vo as was described in conjunction with FIG. 2. In another embodiment, the active feedback to controller 220 may be taken from $V_P$ at the primary side of the transformer 226, for example, by using the transformer auxiliary winding. In one embodiment, feedback loop 514 is used to detect fluctuations in Vo. A proportional-integral-derivative (PID) controller 516 in controller 220 is used to generate an error signal between Vo or $V_P$ and a reference signal $V_r$, which is then fed into PFM 506. PFM 506 uses this error signal to adjust the frequency modulated pulse signals to compensate for the errors.

In one embodiment, PID controller 516 may be used to detect a change in Vo caused by a sudden change of load condition Ro. Recall that gain curves 300 in FIG. 3 illustrate that different load conditions can have very different gains at the same driving frequency. In one embodiment, if a load condition change has been detected by PID controller 516, PFM 506 can offset one of base frequency $f_b$ and peak frequency $f_p$, or both frequencies to compensate for this change, thereby maintaining Vo levels.

In some embodiments, ZCD 504 and $V_{dc}$ input may be eliminated from controller 220. In these embodiments, controller 220 uses the phase information extracted from feedback input Vo or $V_P$ to synchronize the selected lookup table with $V_{dc}$. These embodiments may result in a more compact controller design than the embodiment shown in FIG. 5.

Figure 6:
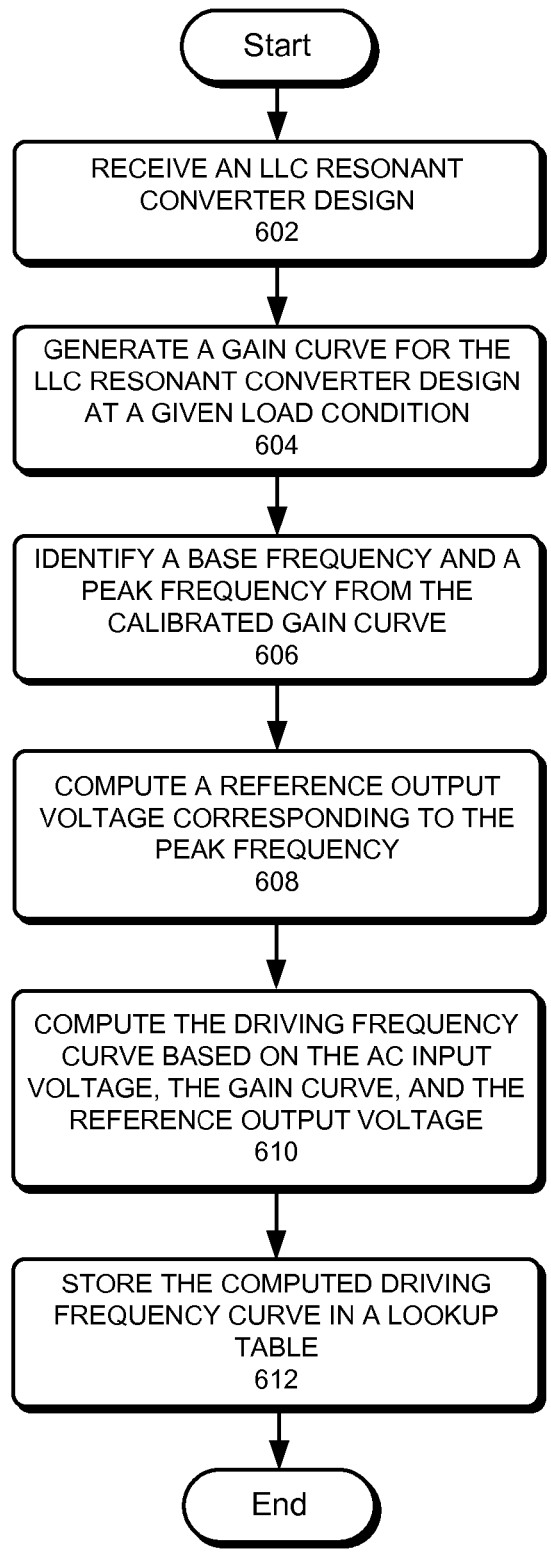
FIG. 6 presents a flowchart illustrating the process of constructing a driving frequency curve for the lookup table in accordance with some embodiments herein.

FIG. 6 presents a flowchart illustrating the process of constructing a driving frequency curve for the lookup table in accordance with some embodiments herein. In one or more embodiments, one or more of the steps may be omitted, repeated, and/or performed in a different order. Accordingly, the specific arrangement of steps shown in FIG. 6 should not be construed as limiting the scope of the embodiments.

During operation, the system receives an LLC resonant converter design (step 602). Note that, for the given design, Lr, Cr, and Lm have fixed values. The system then generates a gain curve for the LLC resonant converter design at a given load condition (step 604). In one embodiment, the gain curve is obtained by measuring the characteristic gain ($G=V_P/V_O$) of the LLC resonant converter design as a function of frequency. In one embodiment, the given load condition is a full load condition.

Next, the system identifies a base frequency and a peak frequency from the calibrated gain curve (step 606). In one embodiment, the gain curve between the identified base frequency and peak frequency monotonically decreases. The system then computes a reference output voltage corresponding to the peak frequency (step 608). In one embodiment, the system computes the reference output voltage by multiplying the peak amplitude of an AC input voltage with the characteristic gain associated with the peak frequency. Next, the system computes the driving frequency curve based on the AC input voltage, the calibrated gain curve, and the reference output voltage (step 610) and subsequently stores the computed driving frequency curve in a lookup table (step 612).

Figure 7:
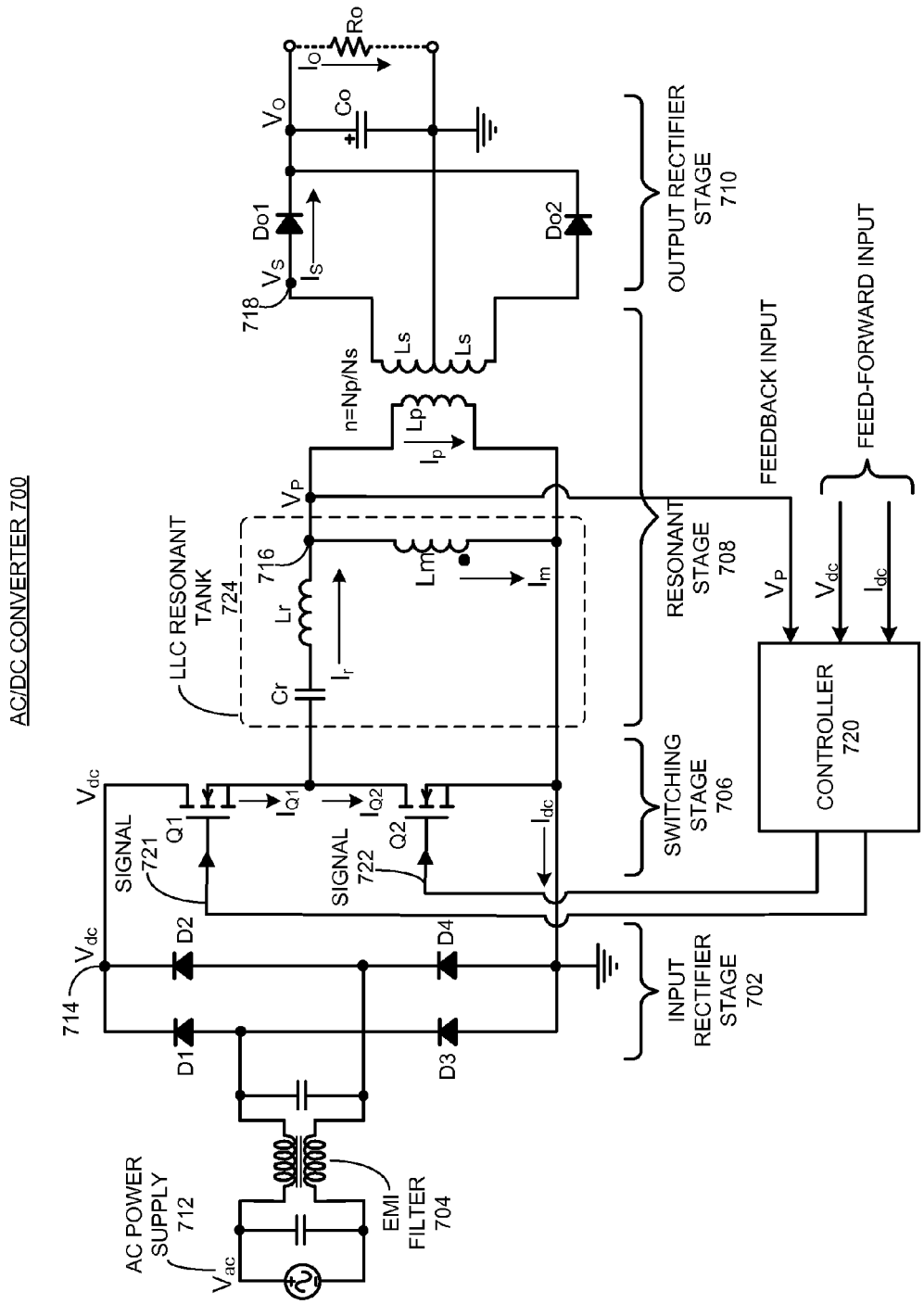
FIG. 7 illustrates an AC/DC power converter which converts an AC input voltage $V_{ac}$ to a DC output voltage Vo in accordance with some embodiments herein.

FIG. 7 illustrates an AC/DC power converter 700 which converts an AC input voltage $V_{ac}$ to a DC output voltage Vo in accordance with some embodiments herein.

As is illustrated in FIG. 7, AC/DC converter 700 also includes an input rectifier stage 702, a switching stage 706, a resonant stage 708, and an output rectifier stage 710. Each of these stages is substantially identical to the corresponding stage in AC/DC converter 200 of FIG. 2. Similarly, AC/DC converter 700 does not use a PFC stage between rectifier stage 702 and switching stage 706, thereby eliminating the bulky high voltage DC capacitor. Note that AC/DC converter 700 also includes an EMI filter 704 coupled between AC power supply 712 and input rectifier stage 702.

FIG. 7 also shows various voltage and current signals within AC/DC converter 700. The voltage signals include the first rectified voltage $V_{dc}$ at node 714, the primary voltage $V_P$ of the transformer at node 716, the secondary voltage $V_S$ of the transformer at node 718, and the second rectified voltage, i.e., the output voltage Vo of AC/DC converter 700. The current signals include drain-source current $I_{Q1}$ of switch Q1, drain-source current $I_{Q2}$ of switch Q2, the first rectified current $I_{dc}$, the leakage inductor current $I_r$, the magnetizing inductor current $I_m$, the primary current of transformer $I_P$, the secondary current of transformer $I_S$, and the output current Io of AC/DC converter 700.

As illustrated in FIG. 7, AC/DC converter 700 also includes a controller 720 which generates control signals 721 and 722 that drive switches Q1 and Q2, respectively. Similarly to AC/DC converter 200, AC/DC converter 700 may receive the first rectified voltage $V_{dc}$ as a feed-forward input, which may be used to detect zero crossings within $V_{dc}$. AC/DC converter 700 may also receive the first rectified current $I_{dc}$ as a feed-forward input, which may be used to detect zero crossings within $I_c$. However, unlike AC/DC converter 200, AC/DC converter 700 does not use the rectified voltage $V_O$ as a feedback signal to controller 720. Instead, controller 720 receives the primary voltage $V_P$ of the transformer as a feedback input. As a result, controller 720 is coupled between the inputs of switching stage 706 and the output of the LLC resonant tank 724. In some embodiments, controller 720 is used in a feedback loop which adjusts control signals 721 and 722 so that output voltage $V_O$ is a substantially regulated DC voltage against the AC input voltage and load variations. Note that controller 720 may include other inputs and outputs in addition to the three inputs and two outputs shown in FIG. 7.

Figure 8:
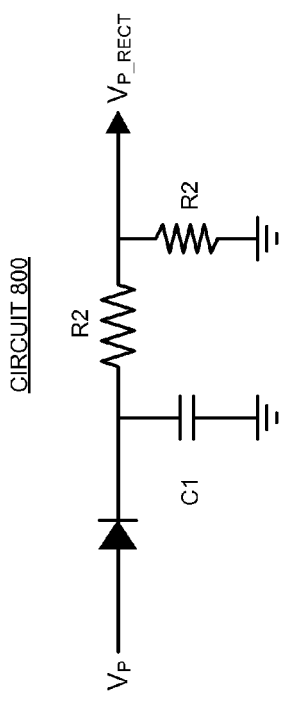
FIG. 8 illustrates an exemplary circuit which is capable of rectifying and filtering high frequency AC voltage $V_P$ to obtain a filtered voltage $V_{P\_RECT}$ in accordance with some embodiments herein.

Note that the feedback voltage $V_P$ is an unregulated high frequency AC signal (due to the high resonant frequency of LLC resonant tank 724) modulated by the low frequency sine-wave |sin(wt)|, wherein w is the frequency of the AC input $V_{ac}$. In one embodiment, prior to using $V_P$ to generate Q1 and Q2 control signals in controller 720, AC voltage $V_P$ is rectified and high-pass filtered to substantially remove its high frequency component. FIG. 8 illustrates an exemplary circuit 800 which is capable of rectifying and filtering high frequency AC voltage $V_P$ to obtain a filtered voltage $V_{P\_RECT}$ in accordance with some embodiments herein. Note that circuit 800 may be implemented either outside of controller 720 or within controller 720. Ideally, the output voltage $V_{P\_RECT}$ from circuit 800 is enveloped and close to a DC voltage. In one embodiment, the output voltage $V_{P\_RECT}$ may be substantially bounded in a range between a low bound $V_{h\_low}$ and a high bound $V_{h\_high}$, which will be described in more detail below in conjunction with FIG. 9.

In some embodiments, rather than receiving the primary winding voltage $V_P$, controller 720 can receive the secondary winding voltage Vs as a feedback signal to detect the output voltage variation. While we describe an exemplary design of controller 720 in the context of using voltage $V_P$ as the feedback below, the described technique is generally applicable to the embodiments when the secondary winding voltage Vs is used as the feedback signal.

Figure 9:
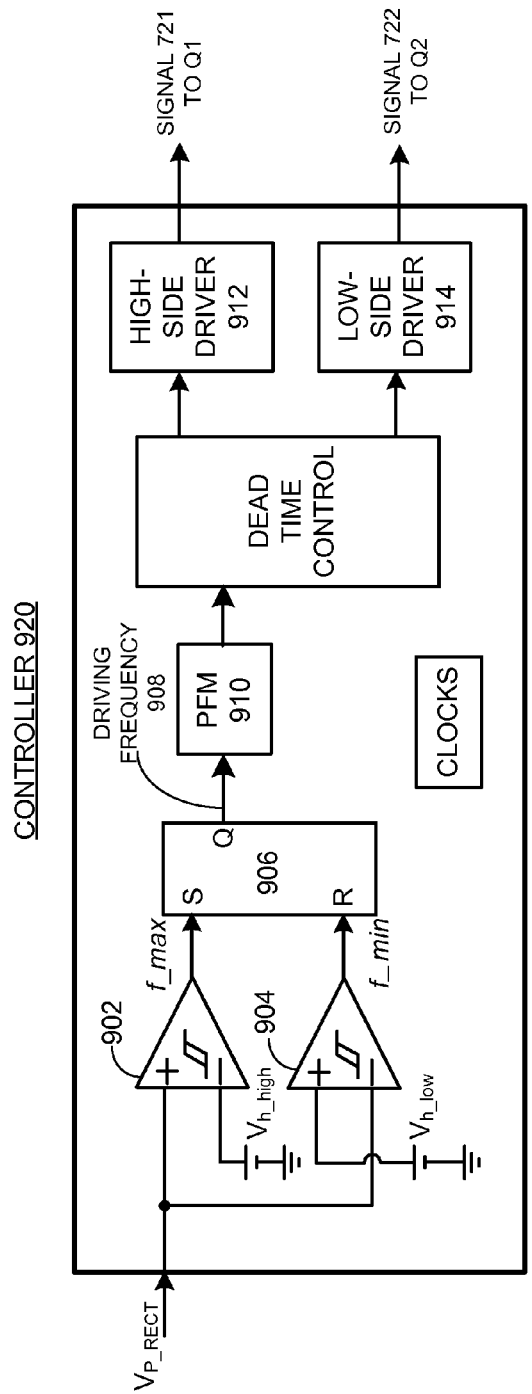
FIG. 9 presents a block diagram illustrating an embodiment of the controller within the AC/DC converter of FIG. 7 in accordance with some embodiments herein.

FIG. 9 presents a block diagram illustrating an embodiment of controller 720 within AC/DC converter 700 in accordance with some embodiments herein. As is illustrated in FIG. 9, controller 920 receives rectified and filtered voltage $V_{P\_RECT}$, which is then compared with two reference voltages. In one embodiment, the two reference voltages are set based on the low bound $V_{h\_low}$ and the high bound $V_{h\_high}$ of $V_{P\_RECT}$. In the embodiment shown in FIG. 9, the two references voltages are set to be $V_{h\_low}$ and $V_{h\_high}$, respectively.

More specifically, the upper comparator 902 in controller 920 compares $V_{P\_RECT}$ with $V_{h\_high}$, and outputs "high" if $V_{P\_RECT} > V_{h\_high}$, while the lower comparator 904 in controller 920 compares $V_{P\_RECT}$ with $V_{h\_low}$, and outputs "high" if $V_{P\_RECT} < V_{h\_low}$. Note that the outputs of comparators 902 and 904 are coupled to a 2-to-1 selector 906, which selects one of the two driving frequencies: f_max or f_min (f_max>f_min) based on the comparator outputs. More specifically, when $V_{P\_RECT} > V_{h\_high}$, f_max is selected and output by selector 906; when $V_{P\_RECT} < V_{h\_low}$, f_min is selected and output by selector 906.

Note that $V_{h\_low}$ and $V_{h\_high}$ may be determined based on a desired output voltage Vo, the transformer turn ratio, and a ripple tolerance level of the desired output voltage Vo. For example, if the desired output voltage Vo=5V, and the turn ratio=10, a nominal $V_{P\_RECT}$=50V can be obtained. Hence, to achieve a ripple tolerance level of ±0.2V in Vo, $V_{h\_low}$ and $V_{h\_high}$ can be set to 50V−2V=48V and 50V+2V=52V, respectively.

Further referring to FIG. 9, note that the selected driving frequency 908 is fed into pulse frequency modulator (PFM) 910. PFM 910 is configured to generate frequency modulated pulse signals based on the selected driving frequency 908, wherein the frequency modulated pulse signals are used by a high-side driver 912 and a low-side driver 914 to generate the two control signals 721 and 722, respectively, for the two switches Q1 and Q2 in AC/DC converter 700.

As previously discussed, when f_max is selected as drive frequency 908, both $V_{P\_RECT}$ and output voltage Vo are decreased because resonant converter gain is lower at a high driving frequency. This action causes the output voltage to decrease until the driving frequency is changed. On the other hand, when f_min is selected, both $V_{P\_RECT}$ and output voltage Vo are increased because resonant converter gain is higher at a low driving frequency. This action causes the output voltage to increase until the driving frequency is changed. Moreover, because controller 920 is used in a feedback loop, controller 920 continues operating to keep $V_{P\_RECT}$ substantially within the predetermined bounds of $V_{h\_low}$ and $V_{h\_high}$. As a result, the $V_{P\_RECT}$ voltage is controlled and regulated against input voltage variation and load change. Although $V_{P\_RECT}$ has a ripple bounded by $V_{h\_low}$ and $V_{h\_high}$, the output voltage Vo can have a significantly more flat and smaller ripple due to the large output capacitor Co at output stage 710.

Figure 10:
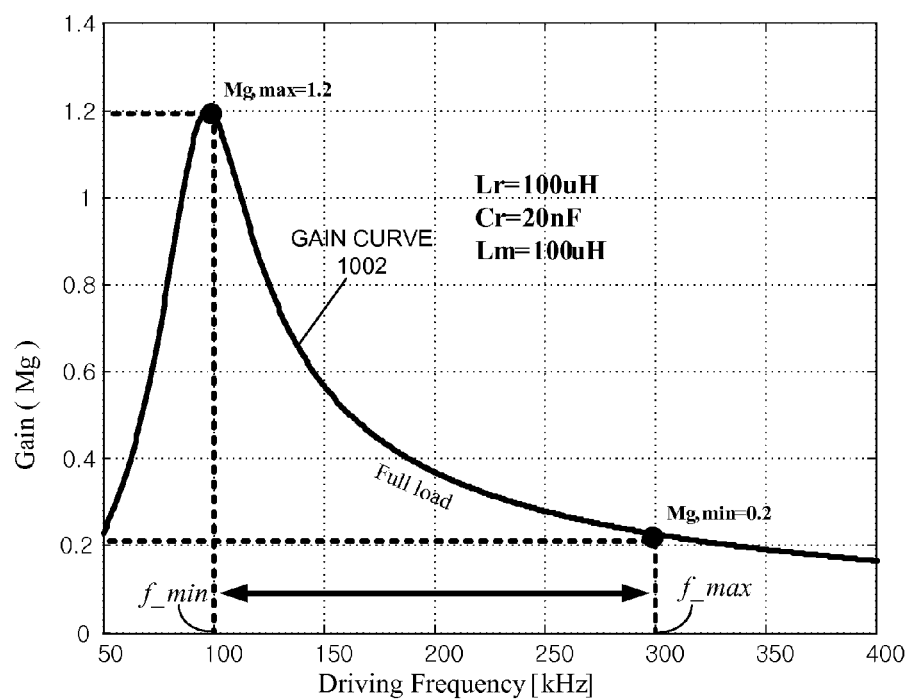
FIG. 10 illustrates an exemplary technique for determining driving frequencies f_min and f_max for a given LLC resonant converter design in accordance with some embodiments herein.

FIG. 10 illustrates an exemplary technique for determining driving frequencies f_min and f_max for a given LLC resonant converter design in accordance with some embodiments herein. More specifically, FIG. 10 illustrates a gain curve 1002 measured for an LLC resonant converter at full load condition, wherein the LLC resonant tank has the following values: Lr=100 µH, Cr=20 nF, and Lm=100 µH. In the embodiment shown, f_min is determined where gain curve 1002 reaches the maximum gain $Mg_{,max}$=1.2 at a driving frequency f_min ≈100 kHz. Separately, f_max is determined where gain curve 1002 reaches a minimum gain $Mg_{,min}$=0.2 at a driving frequency f_max≈300 kHz.

Figure 11:
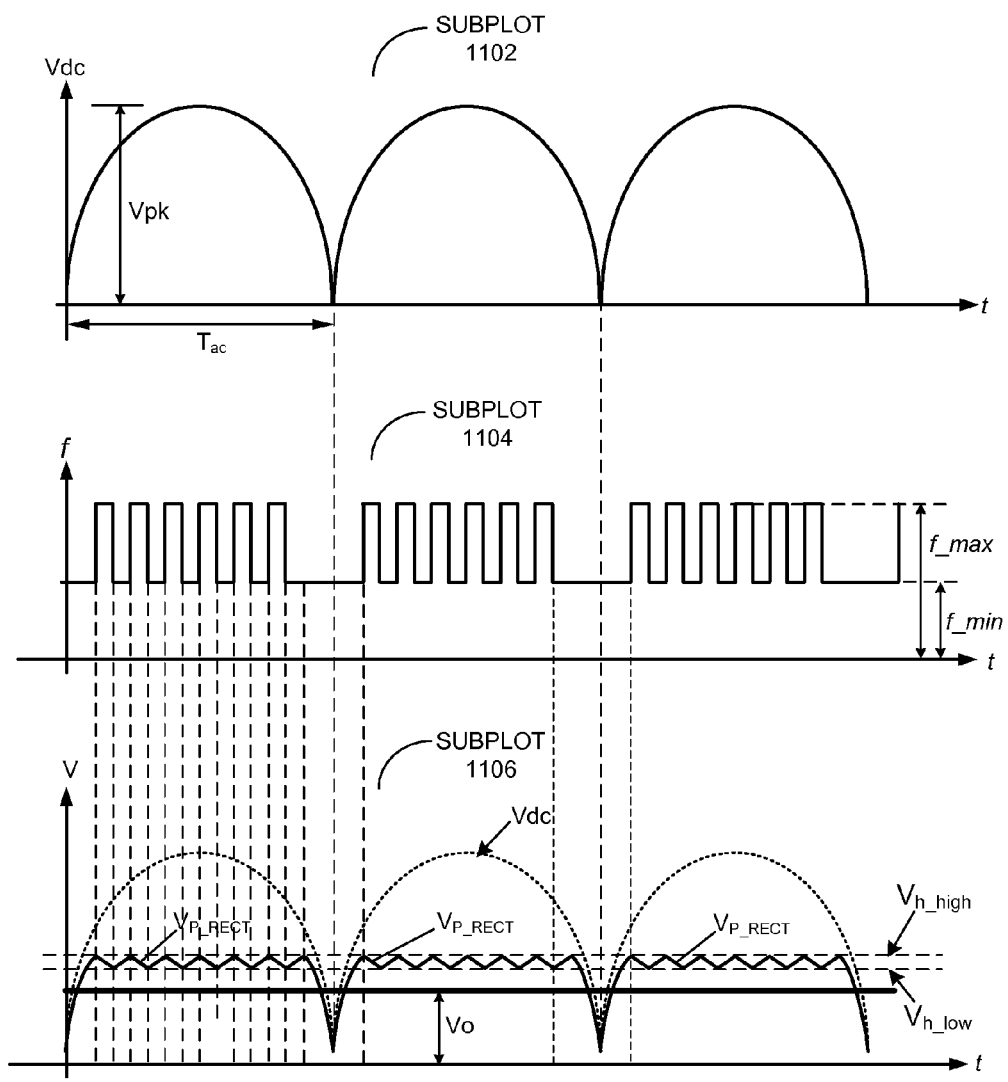
FIG. 11 illustrates a process for generating a flat DC output Vo by using a hysteretic-mode PFM controller in accordance with some embodiments herein.

FIG. 11 illustrates a process for generating a flat DC output Vo by using hysteretic-mode PFM controller 920 in accordance with some embodiments herein. Without losing generality, FIG. 11 is described in the context of FIGS. 7-9. Note that FIG. 11 comprises three subplots. The top subplot 1102 illustrates the rectified voltage $V_{dc}$ at the output of input rectifier stage 702 as a function of time. More specifically, subplot 1102 includes three periods (3×$T_{ac}$) of sinewaves of the same polarity and a peak amplitude $V_{pk}$. The problem is to determine driving frequency "f" which controls system gain so that AC/DC converter output Vo is substantially a constant DC voltage.

The middle subplot 1104 illustrates the driving frequency f as a function of time over the same time period as subplot 1102. Note that within each period $T_{ac}$, driving frequency f switches between f_min and f_max as a direct result of the design of controller 920 described in FIG. 9. More specifically, when the driving frequency is switched from one frequency to the other, the system gain is reversed. For example, when controller 920 detects that $V_{P\_RECT} V_{h\_high}$, the driving frequency is switched from f_min to f_max and the system gain is dropped. As a result, $V_{P\_RECT}$ is decreased. After $V_{P\_RECT}$ is reduced below high bound $V_{h\_high}$ but before $V_{P\_RECT}$ reaches low bound $V_{h\_low}$, f_max and therefore the low system gain is maintained, shown as the flat regions of f_max values in subplot 1104. During this time interval, $V_{P\_RECT}$, shown in the bottom subplot 1106 as a periodic zigzag pattern, continues to decrease toward $V_{h\_low}$. This can be observed in subplot 1106 where $V_{P\_RECT}$ drops from DC level $V_{h\_high}$ to DC level $V_{h\_low}$ when f=f_max is maintained.

After $V_{P\_RECT}$ reaches low bound $V_{h\_low}$, reversal occurs when the driving frequency f is switched from f_min and f_max and the system gain is boosted. Similarly, after $V_{P\_RECT}$ is increased above $V_{h\_low}$ but before $V_{P\_RECT}$ reaches $V_{h\_high}$, f_min and therefore the high system gain is maintained, shown as the flat regions of f_min values in subplot 1104. During this time interval, $V_{P\_RECT}$, shown in the bottom subplot 1106, continues to increase toward DC level $V_{h\_high}$. Note that the above-described control operation is a hysteretic process that keeps $V_{P\_RECT}$ bounded between $V_{h\_low}$ and $V_{h\_high}$ while generating a hysteretic ripple. Hence, controller 920 is also referred to as a "hysteretic-mode PFM controller" and AC/DC converter 700 using such a controller may be referred to as a "hysteretic-mode PFM resonant AC/DC converter."

Note that subplot 1106 also shows the converter output Vo as a substantially DC voltage (not to scale). This result can be achieved because: (1) Vo is stepped down from $V_{P\_RECT}$ based on the turn ratio; and (2) large DC capacitor Co further flats out Vo.

Compared to AC/DC converter 200, AC/DC converter 700 uses the primary voltage information ($V_{P\_RECT}$) of the transformer as the feedback signal rather than using the output voltage directly from output stage. A potential advantage of AC/DC converter 700 over AC/DC converter 200 is the control speed. Note that output voltage may have an inherently slow response because of the bulky DC capacitor in the output stage. In comparison, the primary voltage of the transformer operates at a much faster speed due to the high resonant frequency, and hence may facilitate achieving a faster response time.

Note that while the above-described hysteretic-mode frequency controls can cause hysteretic ripple in the primary voltage $V_{P\_RECT}$, the size of the ripple can be effectively controlled using carefully selected bounds ($V_{h\_low}$ and $V_{h\_high}$). While a narrower bound may help to reduce ripple, the trade-off can include lower design margins for the controller design. Even by allowing some hysteretic ripple in the primary voltage, the output voltage can be substantially flat without hysteretic ripple because of the bulky DC capacitor at the output and the voltage step-down by the transformer.

Another difference between AC/DC converter 200 (which uses output voltage feedback information) and AC/DC converter 700 (which uses the primary voltage information of the transformer) is that the latter design typically does not need an opto-coupler and reference-related circuits in the secondary side of the transformer. While not shown in FIG. 2, an opto-coupler may be required to couple the output voltage Vo to controller 220.

In both AC/DC converter 200 and AC/DC converter 700 described above, output rectifier stages 210 and 710 include a full-wave rectifier comprising two diodes Do1 and Do2. In each of these two converter designs, higher converter efficiency can be obtained by replacing the diodes Do1 and Do2 with MOSFETs Qo1 and Qo2. Each of the MOSFETs can be viewed as a transistor coupled in parallel with a body diode. This proposed MOSFET/diode has a lower turn-on voltage than a stand-alone diode, thereby lowering the voltage drop on the rectifier while transferring more power to the load.

In all above-described AC/DC converters, the bulky high-voltage DC capacitor can be eliminated and high efficiency can be obtained with the soft-switching feature of the associated resonant converter. By utilizing high driving frequency, the main transformer size can be small. Because no bulky high-voltage DC capacitor is used in the proposed AC/DC converter designs, high power density, a simple controller, and low cost can be expected.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in, but are not limited to, application-specific integrated circuit (ASIC) chips, field-programmable gate arrays (FPGAs), and other programmable-logic devices.

What is claimed is:

1. An AC/DC power converter for converting an AC input voltage into a DC output voltage, comprising:
    an input rectifier stage that rectifies an AC input voltage into a first rectified voltage;
    a switching resonant stage directly coupled to an output of the input rectifier stage, wherein the switching resonant stage converts the first rectified voltage into a first high frequency AC voltage of a first amplitude;
    a transformer coupled to an output of the switching resonant stage and configured to down-convert the first high frequency AC voltage into a second high frequency AC voltage of a second amplitude;
    an output rectifier stage coupled to an output of the transformer, wherein the output rectifier stage rectifies the second high frequency AC voltage into a DC output voltage; and
    a controller including a first comparator of a first reference voltage and a second comparator of a second reference voltage;
    wherein the controller includes a logic circuit coupled to outputs of the first and the second comparators and to a rectifier circuit, the recifier circuit configured to convert a primary voltage associated with a primary winding of the transformer into a rectified primary voltage;
    wherein the controller receives the rectified primary voltage and, in response, generates one or more control signals to drive the switching resonant stage;
    wherein the logic circuit selects a first driving frequency to generate the one or more control signals when the rectified primary voltage is greater than the first reference voltage; and
    wherein the logic circuit selects a second driving frequency to generate the one or more control signals when the rectified primary voltage is less than the second reference voltage.

2. The AC/DC power converter of claim 1, wherein the primary voltage is the first high frequency AC voltage.

3. The AC/DC power converter of claim 1, wherein the first reference voltage and the second reference voltage define a range of variation for the rectified primary voltage.

4. The AC/DC power converter of claim 1, wherein the first driving frequency is associated with a first gain of the switching resonant stage, wherein the second driving frequency is associated with a second gain of the switching resonant stage; and wherein the first gain is less than the second gain.

5. The AC/DC power converter of claim 1, wherein the first driving frequency is greater than the second driving frequency.

6. The AC/DC power converter of claim 1, wherein the controller receives the rectified primary voltage as a feed-forward input signal.

7. The AC/DC power converter of claim 6, wherein the controller includes a feed-forward synchronization circuit that is configured to synchronize the one or more control signals with the rectified primary voltage.

8. The AC/DC power converter of claim 1, wherein the switching resonant stage further comprises:
    a switching stage that includes one or more switches; and
    a resonant stage which is coupled to an output of the switching stage.

9. The AC/DC power converter of claim 8, wherein the resonant stage further comprises an LLC resonant tank that includes two inductors and a single capacitor.

10. The AC/DC power converter of claim 9, wherein one or both of the two inductors is integrated with the transformer to form an integrated transformer.

11. The AC/DC power converter of claim 1, wherein the AC/DC power converter does not use a pre-regulator (PFC) stage between the input rectifier stage and the switching resonant stage.

12. A power supply, comprising:
    an AC power connector; and an AC/DC power converter coupled to the AC power connector and configured to convert an AC input voltage to a DC output voltage; wherein the AC/DC power converter further comprises:
        an input rectifier stage which rectifies the AC input voltage into a first rectified voltage;
        a switching resonant stage directly coupled to an output of the input rectifier stage, wherein the switching resonant stage converts the first rectified voltage into a first high frequency AC voltage of a first amplitude;
        a transformer coupled to an output of the switching resonant stage and configured to down-convert the first high frequency AC voltage into a second high frequency AC voltage of a second amplitude;
    an output rectifier stage coupled to an output of the transformer, wherein the output rectifier stage rectifies the second high frequency AC voltage into the DC output voltage; and
    a controller including a first comparator of a first reference voltage and a second comparator of a second reference voltage;
    wherein the controller includes a logic circuit coupled to outputs of the first and the second comparators and to a rectifier circuit, the rectifier circuit configured to convert a primary voltage associated with a primary winding of the transformer into a rectified primary voltage;
    wherein the controller receives the rectified primary voltage and, in response, generates one or more control signals to drive the switching resonant stage;

wherein the logic circuit selects a first driving frequency to generate the one or more control signals when the rectified primary voltage is greater than the first reference voltage; and wherein the logic circuit selects a second driving frequency to generate the one or more control signals when the rectified primary voltage is less than the second reference voltage.

13. The power supply of claim 12, wherein the primary voltage is the first high frequency AC voltage.

14. The power supply of claim 12, wherein the first reference voltage and the second reference voltage define a range of variation for the rectified primary voltage.

15. The power supply of claim 12, wherein the first driving frequency is associated with a first gain of the switching resonant stage, wherein the second driving frequency is associated with a second gain of the switching resonant stage; and wherein the first gain is less than the second gain.

16. The power supply of claim 12, wherein the first driving frequency is greater than the second driving frequency.

17. The power supply of claim 12, wherein the controller receives the rectified primary voltage as a feed-forward input signal.

18. The power supply of claim 17, wherein the controller includes a feed-forward synchronization circuit that is configured to synchronize the one or more control signals with the rectified primary voltage.

19. The power supply of claim 12, wherein the switching resonant stage of the AC/DC power converter further comprises:
   a switching stage that includes one or more switches; and
   a resonant stage which is coupled to an output of the switching stage.

20. The power supply of claim 19, wherein the resonant stage further comprises an LLC resonant tank that includes two inductors and a single capacitor.

21. The power supply of claim 20, wherein one or both of the two inductors is integrated with the transformer to form an integrated transformer.

22. The power supply of claim 12, wherein the AC/DC power converter does not use a pre-regulator (PFC) stage between the input rectifier stage and the switching resonant stage.

23. A system that converts an AC input voltage into a DC output voltage, comprising:
   an input rectifier stage which rectifies an AC input voltage into a first rectified voltage;
   a switching resonant stage directly coupled to an output of the input rectifier stage, wherein the switching resonant stage converts the first rectified voltage into a first high frequency AC voltage of a first amplitude;
   a transformer coupled to an output of the switching resonant stage and configured to down-convert the first high frequency AC voltage into a second high frequency AC voltage of a second amplitude;
   an output rectifier stage coupled to an output of the transformer, wherein the output rectifier stage rectifies the second high frequency AC voltage into a DC output voltage; and
   a controller including a first comparator of a first reference voltage and a second comparator of a second reference voltage;
   wherein the controller includes a logic circuit coupled to outputs of the first and the second comparators and to a rectifier circuit, the rectifier circuit configured to convert a primary voltage associated with a primary winding of the transformer into a rectified primary voltage;
   wherein the controller receives the rectified primary voltage and, in response, generates one or more control signals to drive the switching resonant stage;
   wherein the logic circuit selects a first driving frequency to generate the one or more control signals when the rectified primary voltage is greater than the first reference voltage; and
   wherein the logic circuit selects a second driving frequency to generate the one or more control signals when the rectified primary voltage is less than the second reference voltage.

* * * * *